Dec. 1, 1970          M. R. PASLEY ET AL          3,544,961
DELIVERY EQUIPMENT SAFETY DEVICE
Filed June 8, 1967
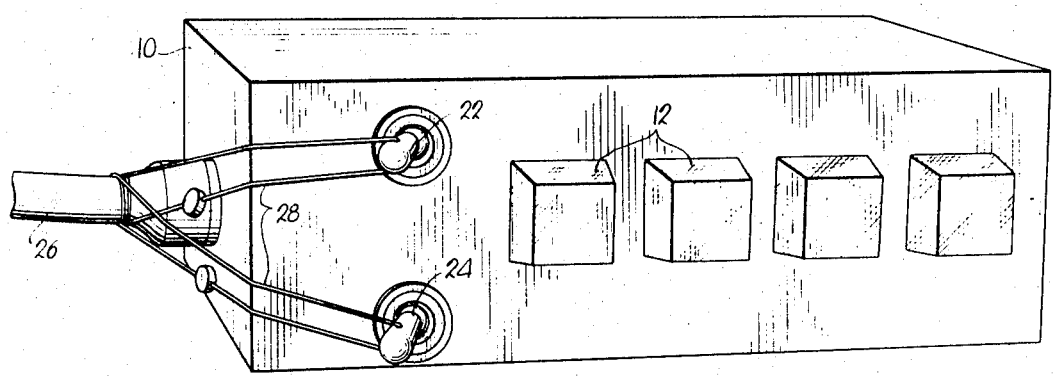
*Fig.1.*
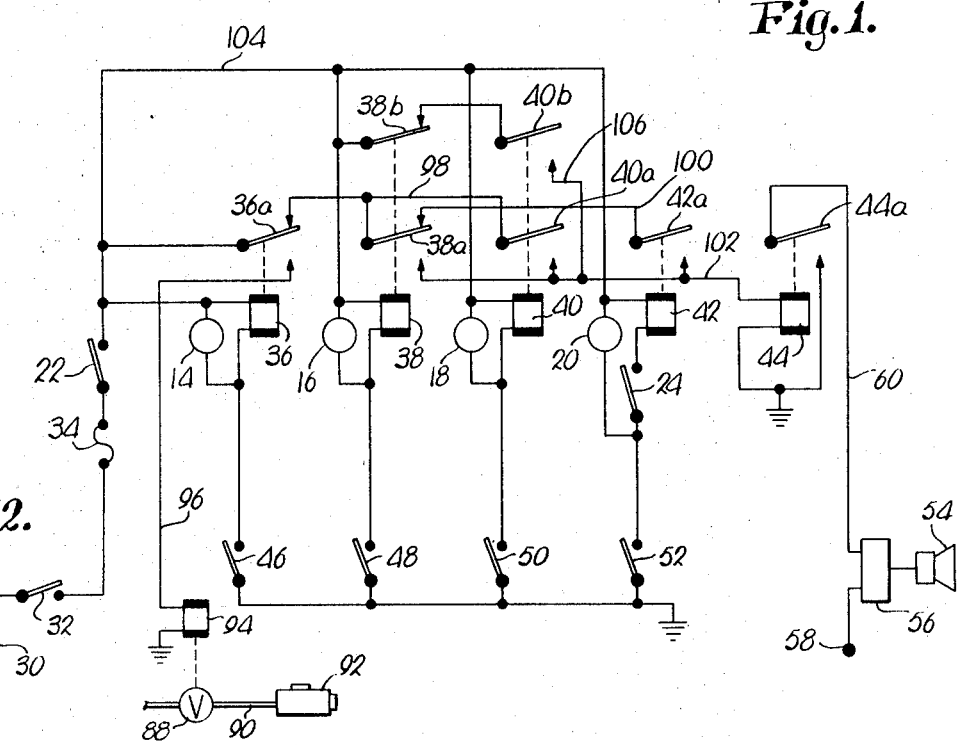
*Fig.2.*
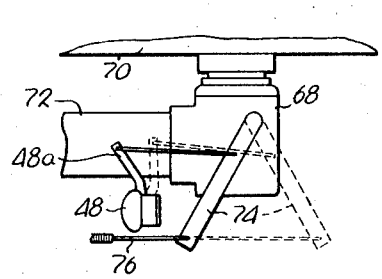
*Fig.4.*
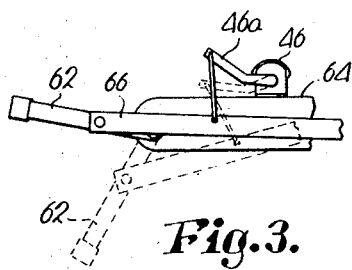
*Fig.3.*
*Fig.5.*
INVENTORS.
Marquis R. Pasley
Ceylon B. Frazer
BY Schmidt, Johnson, Hovey,
Williams & Bradley
ATTORNEYS.

United States Patent Office 3,544,961
Patented Dec. 1, 1970

3,544,961
DELIVERY EQUIPMENT SAFETY DEVICE
Marquis R. Pasley, Shawnee Mission, and Ceylon B. Frazer, Overland Park, Kans., assignors to Pasley Manufacturing & Distributing Co., Inc., Kansas City, Mo., a corporation of Missouri
Filed June 8, 1967, Ser. No. 644,559
Int. Cl. G08b 5/00
U.S. Cl. 340—53                                7 Claims

ABSTRACT OF THE DISCLOSURE

In a delivery truck, electrical switches are associated with the various actuatable components thereof employed during a delivery operation. Each switch senses the operational state of an associated component. Relay circuitry connects the switches with the horn of the vehicle and is arranged to energize the horn if the vehicle operator fails to actuate the delivery components in a predetermined order or, after the delivery operation is concluded, fails to deactivate the components in a predetermined sequence selected to assure that the vehicle is returned to a safe traveling condition.

---

In delivery trucks or other vehicles having a power takeoff and other components intended for operation when the vehicle is parked, a careless operator may forget to disengage the power takeoff or deactivate such other components prior to driving the vehicle from the parked location. To cite a specific example where an extreme hazard is created by operator errors as well as the possibility of damaging the equipment, liquified gas delivery trucks commonly employ a number of operator controlled delivery components which must be operated in proper sequence for safe handling of the gas. A power takeoff drives the gas delivery pump and operation thereof should be effected only after the delivery valve of the gas storage tank is opened. Additionally, the connecting hoses which extend from the truck storage tank to the tanks being filled at the delivery site must be properly handled or a hazardous condition will be created. Besides the common error of driving the truck away from the site without disengaging the power takeoff, or closing the delivery valve, in some instances operators have forgotten to disconnect the delivery hoses and place the same in a storage compartment on the truck provided for such purpose, resulting in the creation of an extreme hazard to both life and property when the hoses snap as the truck pulls away from the delivery site.

It is, therefore, the primary object of this invention to provide safety apparatus for signalling an operator when an error is made in the operation of equipment of the type having actuatable components which must be operated in a particular sequence for safe usage of the equipment.

As a corollary to the foregoing object, it is an important aim of the instant invention to provide safety apparatus as aforesaid particularly adapted for employment with a delivery vehicle in which such components are utilized to effect the delivery operation, and that signals the operator in the event the components are not deactivated in a manner to return the equipment to a safe and inoperative state before the vehicle is driven from the delivery site.

A further and important object of the invention is to provide such safety apparatus which establishes both a predetermined order of actuation of said components and a predetermined sequence of deactivation thereof which the operator is induced to follow.

Still another important object of this invention is to provide safety apparatus as aforesaid which is responsive to the operational state of the parking brake of the vehicle, in order to include the brake in the operational sequence established by the apparatus.

Additionally, it is a specific object of the invention to provide safety apparatus as set forth above which will energize the horn of the vehicle when an error is committed by the operator during either actuation or deactivation of the delivery components.

In the drawing:
FIG. 1 is a front perspective view of the housing of the control circuitry of the instant invention;
FIG. 2 is an electrical schematic diagram of the circuitry; and
FIGS. 3, 4 and 5 show the positioning and operation of switches which sense the operational condition of the various delivery components illustrated.

A housing 10 illustrated in FIG. 1 is preferably mounted under the dashboard of a delivery vehicle such as a truck, or mounted in any other suitable position in the cab where it may be seen by the vehicle operator. A row of four lenses 12 project from the front panel of housing 10 and are illuminated by electric lamps 14, 16, 18 and 20 shown schematically in FIG. 2. A pair of on-off toggle switches 22 and 24 are tied to a cable 26 by a pair of seal wires 28 to hold both switches in the "on" position.

Referring to FIG. 2, the battery of the vehicle is illustrated at 30 connected between chassis ground and an ignition switch 32 which, for purposes of illustration, is shown as a simple single-pole, single-throw switch. The contact of ignition switch 32 is connected to the movable pole of switch 22 through a fuse 34. Five electromechanical relays are employed having coils 36, 38, 40, 42 and 44. Relay coil 36 operates a relay switch 36a, relay coil 38 operates a pair of relay switches 38a and 38b, relay coil 40 is coupled with a pair of relay switches 40a and 40b, relay coil 42 actuates a relay switch 42a, and relay coil 44 operates a relay switch 44a. All relays are shown deenergized; switches 22 and 24 are illustrated open but are normally closed during use of the control apparatus.

Four normally open switches 46, 48, 50 and 52 are in series between respective relay coils 36, 38, 40 and 42 and chassis ground. The four lamps 14, 16, 18 and 20 are connected in parallel with respective relay coils 36, 38, 40 and 42, the lamp 20 being connected to coil 42 through the switch 24. It will be appreciated hereinafter that switch 22 is a master on-off switch for the unit while switch 24 is employed as a silencing switch for the vehicle horn 54. The horn relay 56 of the vehicle is connected to a power terminal 58 which may be directly connected to the ungrounded side of battery 30 or connected to such battery through an accessory switch operated by the ignition key. A ground connection for horn relay 56 is available via a lead 60 connected to the movable pole of relay switch 44a, the contact thereof being grounded. Thus, upon energization of relay coil 44 to close switch 44a, the horn 54 sounds. Manifestly, the horn may also be operated in the usual manner by depressing the horn button on the steering wheel, such existing connections and existing connections to ignition switch 32 being omitted from the diagram of FIG. 2 for purposes of clarity.

FIGS. 3, 4 and 5 illustrate the manner in which the sensing switches may be installed on a delivery vehicle. It should be understood that the particular components of the vehicle to be sensed would vary depending upon the nature of the vehicle, a liquid gas delivery truck being selected herein for purposes of illustration. In FIG. 3 a parking brake handle 62 is shown pivotally mounted on a horizontally extending support 64, a pivotal link 66 being connected to handle 62 and extending therefrom to the brake apparatus of the vehicle (not shown). As handle 62 is shifted from the broken-line position to the full-line position thereof illustrated to set the brake, an actuator arm 46a of switch 46 is operated to close the switch contacts.

In FIG. 4 an outlet valve 68 is in communication with a gas storage tank 70 for controlling gas flow from tank 70 through a delivery line 72. Valve 68 is provided with an operating arm 74 which is actuated by a control cable 76. When arm 74 is in the position thereof illustrated by the broken lines, valve 68 is closed. As arm 74 is shifted to its full-line position to open the valve, an actuator arm 48a of switch 48 is operated to close the switch contacts.

In similar fashion, a power takeoff unit 78 is shown fragmentarily in FIG. 5 and is controlled by a rod or plunger 80 operated by a control lever 82. A control cable 84 is utilized to shift lever 82 between the full and broken-line positions thereof, the power takeoff unit 78 being engaged when lever 82 is in the vertical or solid-line position. An actuator arm 50a of switch 50 is spring-biased to close the contacts of switch 50 when released by lever 82 as the latter is shifted to engage the power takeoff. A connection between lever 82 and arm 50a is effected by a pin 86 engaging arm 50a and projecting from lever 82.

As optional equipment, a brake lock valve 88 may be installed in the service brake line 90 of the vehicle leading from the master cylinder or booster 92. Valve 88 is operated by a solenoid 94 connected by a lead 96 to the normally open contact of relay switch 36a. Valve 88 is a one-way check valve which holds pressure in the brake system until released. After solenoid 94 is energized, the brakes are locked by momentarily pressurizing line 90, as by depressing the brake pedal and then releasing the same. To release the brakes, solenoid 94 is de-energized, whereupon the brakes may then be unlocked by again momentarily pressurizing brake line 90.

In the description of the operation of the invention to follow, it will be assumed for purposes of illustration that the safety apparatus of the instant invention is utilized in conjunction with the delivery components normally encountered on liquified gas delivery trucks. Such components include the parking brake illustrated in FIG. 3 and sensed by switch 46, the delivery valve 68 illustrated in FIG. 4 and sensed by switch 48, the power takeoff unit 78 illustrated in FIG. 5 and sensed by switch 50, and the door of a compartment (not shown) utilized to store the gas delivery hoses. Switch 52 would be associated with the compartment door and would be in the open position illustrated when the door is closed. When the door is opened to gain access to the delivery hoses, switch 52 would then close to signify that the door is open and thus that the hoses are accessible to the operator and may, therefore, be connected to tanks at a delivery site which are to be charged with gas.

To install the unit, the connections illustrated in FIG. 2 to ignition switch 32 and the horn relay 56 are made via cable 26 (FIG. 1). The master on-off switch 22 and the horn silencing switch 24 are closed and sealed in the closed position by the tamper wires 28. If desired, tamper wires may also be utilized at the horn relay 56 to prevent the operator from disabling the unit. It should be understood, of course, that an operator may readily break any tamper wires should be condition arise requiring, for example, operation of silencing switch 24 to cease or prevent operation of the vehicle horn. However, special circumstances requiring the disabling of the safety apparatus would be rare, and thus an operator who returns a vehicle with the tamper wires broken would be subject to questioning by his supervisor.

In the instant example of the use and operation of the safety apparatus, it is requisite that, in making a delivery, the operator first set the parking brake of the vehicle, then open the gas delivery valve 68, and then engage the power takeoff unit 78. At any time after the parking brake is set, the operator is free to open the compartment door mentioned above and sensed by switch 52. Additionally, deactivation of these various delivery components must be effected in reverse order with disengagement of the power takeoff 78 and closure of the delivery valve 68 being effected prior to releasing the parking brake.

When the parking brake is set, switch 46 closes to energize relay coil 36 and lamp 14. The energizing of lamp 14 serves to inform the operator that the parking brake is on. Should the operator attempt to open the delivery valve, engage the power takeoff, or open the door of the hose compartment before setting the parking brake, the appropriate relay coil 38, 40 or 42 could be energized by the closure of switch 48, 50 or 52 to, in turn, energize relay coil 44 and sound the horn 54. A lead 98 connects the movable poles of relay switches 38a and 40a with the upper contact of switch 36a, and the pole of relay switch 42a is connected to the upper contact of relay switch 38a by a lead 100. Relay coil 44 is connected to the lower contacts of switches 38a, 40a and 42a by a lead 102. Thus, it is evident that a power circuit to relay coil 44 via lead 102 will be established by energization of either of the relay coils 38, 40 or 42 if relay coil 36 is de-energized.

After the parking brake is set, the operator may then gain access to the delivery hoses without causing horn 54 to sound since battery power is no longer available at lead 100, thus closing of relay switch 42a will not energize relay coil 44. The operator may also now open valve 68 since closure of switch 48 and energization of relay coil 38 will not effect the energization of relay coil 44 because battery power is not available at lead 98. If the operator should attempt to engage the power takeoff 78, however, without first opening delivery valve 68, the horn will sound since closure of relay switch 40b establishes a power circuit to relay coil 44 via lead 104 connected to master switch 22, the closed relay switch 38b, the now closed relay switch 40b, and a lead 106 connected to lead 102.

As the various delivery components of the vehicle are actuated by the operator, the associated lamps illuminate lenses 12 and inform the operator of the operational state of the equipment. It may be desired to use a red lens in association with lamp 20 since, when the compartment door is open, the hoses are accessible and may be connected to tanks at the delivery site to be charged. It should also be noted that, if the apparatus is provided with the optional brake lock feature, the service brakes may be locked any time after the parking brake is set and relay coil 36 is energized.

After the operator has completed the delivery, the various delivery components must be deactivated in proper sequence to assure that the vehicle is returned to a safe traveling condition. Such sequence is the reverse of the sequence set forth above, i.e. switches 50, 48 and 46 must reopen in that order with switch 52 being returned to open condition by closing the compartment door at any time prior to the opening of switch 46 which, of course, occurs when the parking brake is released. Thus, the operator engaged or with the delivery valve open without being warned by the sounding of the horn. Furthermore, all delivery hoses must be in place within the compartment therefor with the door closed. It should be appreciated that, although the horn of the vehicle is illustrated herein as the means of signalling the operator when an error is committed, other signalling devices could be employed or relay 44, 44a could be interposed in the ignition circuit to disable the vehicle motor and thereby inform the operator that the proper sequence of operation or deactivation has not been followed.

Having thus described the invention, what is claimed as new and desired to be secured by Letters Patent is:

1. In a vehicle ultilized to deliver a hazardous substance stored on the vehicle and having operator controllable delivery components including a brake for holding the vehicle when the latter is parked for a delivery, conduit means connectible with storable means at a delivery site for delivering the substance from the vehicle, power means for discharging the substance through said conduit means, and valve means for controlling flow of the substance through said conduit means, and where the vehicle is provided with means for signalling an operator of the vehicle to indicate that an error in operating said components has been made, the combination with said components and said signalling means of:

a device operably associated with each of said components respectively for sensing the operational condition of the associated component;

a condition monitor having event sequence responsive means coupled with said devices and defining a predetermined order of activation of said components for safe usage of the vehicle comprising actuation of said brake, opening of said valve means, and operation of said power means to discharge said substance, and connection of said conduit means with said storage means any time following actuation of said brake;

said sequence responsive means further defining a predetermined, safe sequence of deactivation of said components comprising deactivation of said power means closure of said valve means, and release of said brake, and disconnection of said conduit means from said storage means prior to release of said brake; and means coupling said sequence responsive means with said signalling means;

said sequence responsive means rendering said signalling means operative in response to sensing of actuation of said components by said devices in other than said order, or sensing of deactivation of said components in other than said safe sequence, whereby to induce the operator to follow said order and said sequence.

2. The invention of claim 1, each of said devices including a switch disposed for operation by the associated component upon actuation or deactivation thereof, said sequence responsive means including electrically responsive, bistate switching means for controlling said signalling means, and circuitry for delivering electrical excitation to said switching means to operate the latter, said coupling means being connected to said switching means, said circuitry having an electrically responsive switching structure therein coupled with the switch of each of said devices respectively, said structures being arranged to control said delivery of excitation to said switching means in accordance with said order and said sequence.

3. The invention of claim 2, said structures effecting a change of state of said switching means when said devices sense actuation of said components in other than said order or deactivation thereof in other than said sequence.

4. The invention of claim 2, said switching means having a normal, de-energized state and an energized state for effecting operation of said signalling means, said structures effecting said delivery of excitation to said switching means when said devices sense actuation of said components in other than said order or deactivation thereof in other than said sequence.

5. The invention of claim 2, each of said structures comprising an electromechanical relay having a relay coil responsive to operation of the switch of the corresponding device, and switch means operated by said coil, said circuitry including circuit means interconnecting the switch means of said relays and cooperating therewith to effect a change of state of said bistate switching means when said devices sense actuation of said components in other than said order or deactivation thereof in other than said sequence.

6. The invention of claim 2, said sequence responsive means further including an electric lamp coupled with each of said devices respectively for energization by the switch thereof when the associated component is actuated; and means for mounting said lamps in a visual display pattern in the view of the operator.

7. The invention of claim 2:

and an electrically responsive lock for the service brakes of said vehicle, the structure responsive to the first mentioned brake being coupled with said lock to render the latter operable after actuation of said first mentioned brake.

References Cited

UNITED STATES PATENTS

| | | | |
|---|---|---|---|
| 3,246,310 | 4/1966 | Keller et al. | 340—233 |
| 3,440,524 | 4/1969 | DeJarld et al. | 340—233 |

DONALD J. YUSKO, Primary Examiner

H. S. COHEN, Assistant Examiner

U.S. Cl. X.R.

340—147, 223, 332